United States Patent Office 3,649,510
Patented Mar. 14, 1972

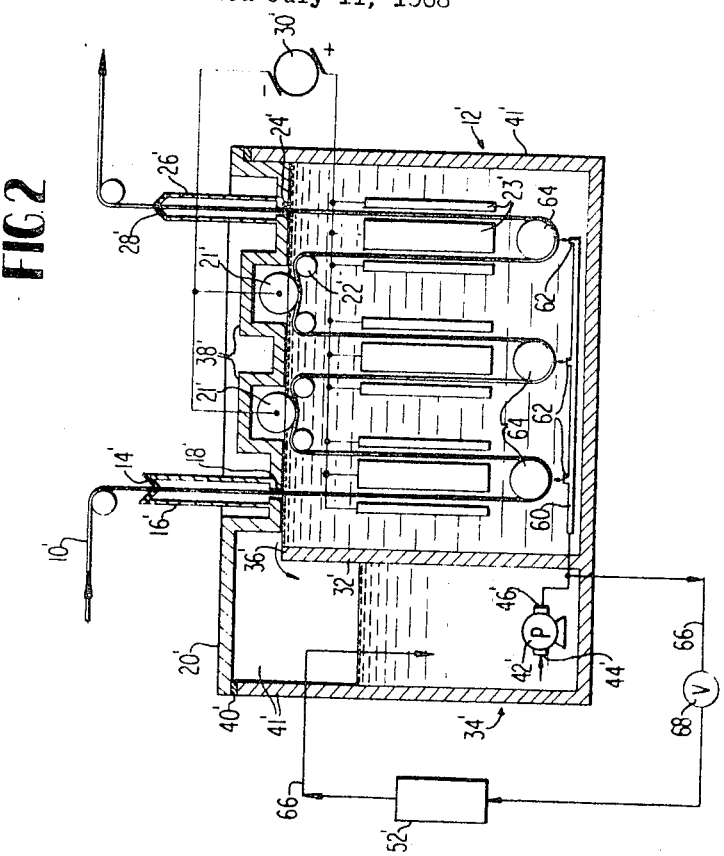

3,649,510
COATING SYSTEM WITH COATING MEDIUM CIRCULATION
Edwin J. Smith, Winterville, Ohio, and Lowell W. Austin, Weirton, W. Va., assignors to National Steel Corporation
Filed July 11, 1968, Ser. No. 743,987
Int. Cl. B05c 11/00; C23b 5/30, 5/68
U.S. Cl. 204—238
3 Claims

ABSTRACT OF THE DISCLOSURE

Large volumes of moisture-sensitive fused salt electrolyte are agitated by circulation without exposing the fused salt to moisture in the surrounding atmosphere. Fused salt in an airtight coating tank flows over a weir into an airtight reservoir for filtration and circulation to the bottom of the coating tank. The salt flows upwardly in the coating tank for continuous overflow into the reservoir.

BACKGROUND OF THE INVENTION

This invention relates to coating systems, and more particularly to electroplating systems including agitation by circulation of moisture-sensitive fused salt electrolytes.

Electroplating aluminum or other metal coatings on continuous steel strip in a fused salt electrolyte involves a number of difficulties. One difficulty arises from the nature of the fused salt electrolyte, which is not only anhydrous but sensitive to water. Moisture reacts with the salt to cause objectionable fuming, decomposition, and chemical losses. Moisture is present in air in sufficient amount to have such adverse effects.

In such electroplating, agitation of the fused salt electrolyte improves coating quality, except as noted hereinafter. Circulation of the electrolyte is an advantageous manner of achieving such agitation, but in establishing a flow pattern for circulation, it is difficult to maintain out of contact with air the large volume of molten salt which must be circulated.

Another of the difficulties encountered is a tendency for the metal coating to be porous. Coating porosity is aggravated rather than improved by agitation of the fused salt electrolyte.

A main object of the invention is the provision of an improved fused salt electroplating system in which large volumes of electrolyte are continuously circulated without contact with the surrounding atmosphere.

Another object of the invention is the provision of a fused salt electroplating system which makes possible the electrodeposition of platings of less porosity.

Other objects and advantages of the invention will appear from the following detailed description which, together with the accompanying drawings, discloses two embodiments of the invention.

BRIEF DESCRIPTION OF THE DRAWINGS

In the drawings:
FIG. 1 is a side cross-sectional, schematic view of a coating system embodying principles of the invention; and
FIG. 2 is a side cross-sectional, schematic view of another coating system embodying principles of the invention.

DETAILED DESCRIPTION OF THE ILLUSTRATED EMBODIMENTS

In FIG. 1, continuous steel strip 10 follows a pass line through a coating tank or plater which is generally indicated at 12. Plater 12 is filled with over 600 gallons of fused salt electrolyte which, for example, can be a mixture of (by weight) 80% aluminum chloride, 10% sodium chloride, and 10% potassium chloride. Strip 10 passes into plater 12 through sealing flaps 14, entry tower 16 and a slit 18 in a cover 20. The strip is guided around a plurality of contact and deflector rolls 21, 22, respectively, to make a plurality of vertical passes between spaced-apart aluminum anodes 23 before emerging through slit 24, exit tower 26, and sealing flap 28.

Anodes 23 are electrically connected to the positive side of generator 30. The negative side of the generator is electrically connected to contact rolls 21, and by the contact rolls to strip 10. Passage of electrical current between the anodes and the strip in a conventional manner deposits aluminum plating on the strip.

Plater 12 includes side walls, one of which forms an overflow weir 32 which spans the width of plater 12. Weir 32 separates the plater from a pumping compartment or reservoir which is generally indicated at 34 and is located at one end of plater 12. Plater 12 is filled with fused salt electrolyte to the level of upper edge 36 of weir 32. Since fused salt electrolyte is continuously added at the bottom of plater 12, there is a continuous flow of fused salt electrolyte over weir 32 into reservoir 34. A portion of cover 20 is spaced above edge 36 of weir 32 to provide a passageway for the overflow, thereby also communicating space above fused salt in reservoir 34 with space above fused salt in plater 12.

Cover 20 is in contact with the upper surface of the fused salt in plater 12 at all possible locations. This minimizes exposed fused salt surface area and therefore the possible area for moisture to contact the salt. The only locations where cover 20 is not in contact with the fused salt are at the entry and exit slits 18, 24 and at bonnet 38, which houses a partially submerged contact roll 21. Upper edge 36 of weir 32 is in generally coplanar relationship with the bottom surface of cover 20, to assure that the surface of the fused salt bath is maintained in contact with the cover. A sealing gasket 40 of rubber or other suitable material maintains cover 20 in sealed relationship with airtight side walls 41 of the plater and reservoir, so that the plater and reservoir are sealed against entry of surrounding air and resultant objectionable fuming, salt decomposition, and chemical losses. Sealing flaps 14, 28 prevent inleak of air through the entry and exit towers.

A pump 42 located in reservoir 34 has an inlet 44 which is in open fluid communication with the reservoir. Pump outlet 46 communicates with an opening 48 in bottom wall 49 of plater 12 through a conduit 50, so fused salt electrolyte in reservoir 34 is circulated to the bottom portion of the plater. A branch conduit 54 communicates pump outlet 46 with reservoir 34. Valve 56 is provided in conduit 54 as a feature for controlling the amount of fused salt pumped to plater 12 bleeding a part of the pump discharge back to the reservoir.

It was noted above that coating porosity was a problem in electroplating systems of the type herein involved. It has been found that solid particulate contaminants cause such porosity. To remove such contaminants, a filter 52 is provided in conduit 50. Filter 52 can be of any suitable type of conventional design. For example, glass wool is satisfactory filter material.

After passing through filter 52, fused salt in conduit 50 is injected into plater 12 through control valve 58 and opening 48. The injected fused salt flows upwardly towards the upper edge 36 of weir 32 and thus provides the desired agitation.

It will be appreciated that the system described in the foregoing circulates large volumes of fused salt and provides a continuous large-volume agitating flow without exposure of circulating fused salt to moisture in air. No air can be drawn in by the overflow at weir 32 because of sealed cover 20. Since the recirculated electrolyte has been filtered of solid particles, coating porosity is decreased. Marring of the coated strip by post-plater rolls is minimized, since solids are not carried from the plating tank.

In the embodiment of FIG. 2, parts similar to elements of FIG. 1 are indicated by primed reference numerals. In FIG. 2, fused salt is returned from reservoir 34' to plater 12' through a conduit 60. Conduit 60 communicates pump outlet 46' with three short, open-ended branch conduits 62. Conduits 62, which are respectively positioned directly below guide rolls 64 inject fused salt into plater 12 and bathe strip 10' passing around the guide rolls with fresh electrolyte while providing more uniform agitation.

In FIG. 2, filtration is effected in filter 52' which is located in a by-pass conduit 66. Conduit 66 communicates pump outlet 46' with reservoir 34'. The volume of fused salt to be filtered is controlled by valve 68, and only an amount sufficient to keep bath contamination at a low level need be passed through the filter.

The invention has been described in connection with two illustrated embodiments, which have been provided for purposes of illustration only and not for definition of the limits of the invention. For defining the scope of the invention, reference will be made to the appended claims. Modifications of the illustrated embodiments can be made without departure from the principles of the invention, and such modifications are within the scope of the claims.

We claim:
1. Electrocoating apparatus, comprising
    an airtight coating tank containing a body of moisture-sensitive fused salt coating medium,
    the body of fused salt coating medium having a surface,
    the coating tank including a top portion and a bottom portion,
    an airtight reservoir adjacent the coating tank,
    means including a weir member for overflowing fused salt coating medium from the top portion of the coating tank into the reservoir, and
    circulating means for passing fused salt coating medium from the reservoir into the coating tank,
    the circulating means including injecting means for injecting fused salt coating medium into the bottom portion of the coating tank,
    the coating tank including cover means having a bottom surface portion in contact with the surface of the body of fused salt coating medium to prevent exposure of the contacted surface area of the moisture-sensitive fused salt coating medium.

2. The apparatus of claim 1,
    the weir member having an upper edge,
    the bottom surface portion of the cover means being in generally coplanar relationship with the upper edge of the weir member.

3. The apparatus of claim 1, including
    filtering means for filtering fused salt coating medium,
    the circulating means including pumping means having an inlet communicating with the reservoir,
    the pumping means having an outlet,
    first conduit means communicating the outlet with the injecting means,
    second conduit means communicating the outlet with the reservoir, and
    means for controlling volume of flow through the second conduit means,
    the filtering means being located in the second conduit means.

References Cited

UNITED STATES PATENTS

| | | | |
|---|---|---|---|
| 2,845,386 | 7/1958 | Olson | 204—237 X |
| 3,259,557 | 7/1966 | Smith et al. | 204—28 |
| 1,590,603 | 6/1926 | Taylor | 204—43 X |
| 3,194,749 | 7/1965 | Furness | 204—238 X |
| 3,310,027 | 3/1967 | Lindemann | 118—602 X |

F. C. EDMUNDSON, Primary Examiner

U.S. Cl. X.R.

118—602; 204—28, 206, 243